UNITED STATES PATENT OFFICE.

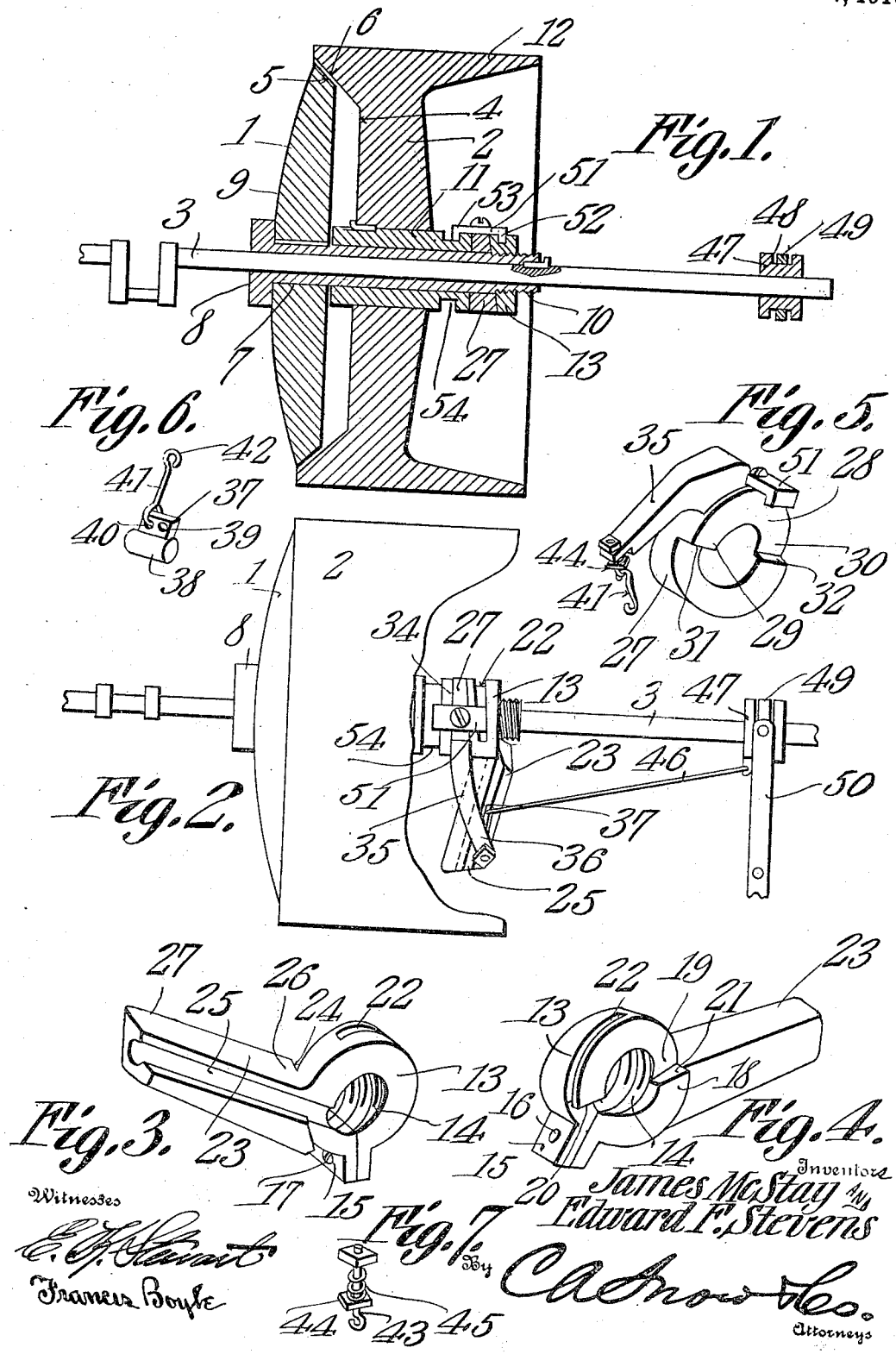

JAMES McSTAY AND EDWARD F. STEVENS, OF CYGNET, OHIO.

CLUTCH-PULLEY.

960,599.  Specification of Letters Patent.  Patented June 7, 1910.

Application filed September 20, 1909. Serial No. 518,547.

*To all whom it may concern:*

Be it known that we, JAMES MCSTAY and EDWARD F. STEVENS, citizens of the United States, residing at Cygnet, in the county of Wood, State of Ohio, have invented a new and useful Clutch-Pulley, of which the following is a specification.

Our invention relates to clutch pulleys and has for an object to provide a simple and durable clutch pulley which will have a small number of parts that will not easily get out of order.

A further object is to provide a clutch pulley which will hold itself tight when pulling a load and will not strain any small parts when expanded.

A further object is to provide a clutch pulley that cannot slip while in frictional engagement with the driving member so that the burning of the belt carried upon the clutch pulley is entirely obviated.

A still further object is to provide a clutch pulley in which the driven pulley may be adjusted relatively to the driving member to take up the wear upon the parts.

With the above advantages and other objects in view which will appear as the description proceeds, our invention comprises certain novel details of construction and combination of parts which will be hereinafter more fully described and pointed out in the appended claims.

In the accompanying drawing:—Figure 1 is a longitudinal sectional view of the clutch pulley constructed in accordance with our invention. Fig. 2 is a plan view of our improved clutch pulley. Fig. 3 is a detailed perspective view of the clutch abutment ring. Fig. 4 is a perspective view of the reverse side of the clutch abutment ring. Fig. 5 is a detailed perspective view of the clutch cam showing the retracting member assembled therewith. Fig. 6 is a detailed perspective view of the shifter. Fig. 7 is a detailed perspective view of the yielding shifter rod.

Like characters of reference designate similar parts in the views shown.

The invention consists of a driving member having an elongated hub rigidly secured to the actuating shaft and a driven member rotatably mounted upon said elongated hub. Adjustably mounted upon the extremity of the elongated hub is an abutment ring having an inclined cam face. A cam ring is mounted for limited rotation upon the elongated hub and is provided with an inclined cam face for engagement with the cam face of the abutment ring. When rocked upon the elongated hub the cam ring engages the abutment ring and driven member and moves the latter into frictional engagement with the driving member.

These and other features of our invention will be readily understood from the following description in which the numeral 1 designates the fast or driving member of the clutch, and the numeral 2 the loose or driven member 3 being a power driven shaft of ordinary construction.

As here illustrated, the driving member 1 projects into a recess or chamber 4 in the driven member and is free to rotate therein, when the parts are not clutched by the devices hereinafter described. The rim 5 of the driving member is beveled, and the lateral walls 6 of the recess correspondingly inclined so that the driving member will wedge tightly into the driven member and insure a positive frictional contact when the parts are in engagement.

A hub 7 is keyed to the actuating shaft 3 and terminates at one end in a retaining flange 8 that bears against the exposed face 9 of the driving member which latter is keyed or otherwise rigidly secured to the hub, or may be made integral therewith within the scope of the invention. The hub is considerably elongated as all the clutch parts are mounted directly upon its peripheral surface. The end of the hub remote from the retaining flange 8 is provided with external screw threads 10.

Loosely mounted for independent rotation upon the elongated hub 7 is a bearing hub 11 to which is keyed or otherwise rigidly secured the driven member 2. The peripheral rim 12 of the driven member is extended to an approximate alinement with the terminal face of the elongated hub, so as to form a broad belt surface and at the same time a housing or guard to prevent injury to the clutch devices in case of the accidental disengagement of the belt.

Mounted upon the threaded extremity of the elongated hub is a split ring 13 having internal screw threads 14 for engagement with the external screw threads of the elongated hub. Ears 15 on each terminal of the split ring are provided with alined openings 16 through which a bolt 17 is passed to draw the ears together and clamp the ring at any desired position on the threaded extremity of the elongated hub. The ring 13 is provided with a helical cam face having alternate elevations 18 and depressions 19 which merge abruptly into each other to form a pair of diametrically opposite stop shoulders 20 and 21 at their point of meeting. A spiral groove 22 is formed upon the periphery of the split ring and is parallel with the inclined edge thereof. The spiral groove 22 is preferably oblong in contour and extends from the stop shoulder 20 half way around to the adjacent stop shoulder 21.

An integral arm 23 projects radially from the periphery of the ring 13 and is offset slightly so as to extend in a plane that intersects the plane of the ring. The arm is substantially rectangular in contour and cross-section and is disposed intermediate the end of the spiral groove 22 and adjacent clamping ear 15, the top face of the arm being flush with the peripheral edge 24 of the shoulder 21. Formed at the intersection of the top face and adjacent lateral face of the arm is a longitudinal channel 25 which is substantially circular in cross-section and is sloped from the root 26 of the arm to the free extremity 27 of the arm.

Mounted for rotation upon the elongated hub is a cam ring 27 having a helical cam face 28 provided with alternate elevations 29 and depressions 20 which merge abruptly into one another to form a pair of diametrically opposite stop shoulders 31 and 32 adapted to abut the stop shoulders 20 and 21 of the ring 13 whereby to limit the rotary movement of the cam ring. The opposite face 33 of the cam ring is plane, that is formed with a smooth surface, so as to form a true bearing surface for contact with the opposed face 34 of the bearing hub 10. An integral arm 35 projects from the periphery of the cam ring 27 and is offset slightly to extend in a plane intersecting the plane of the ring, but in an opposite direction to the offset of the channeled arm 23 so that the terminal 36 of the arm 35 projects over the intermediate portion of the channeled arm, when in operative position.

Slidably mounted in the channel 25 is a shifter 37 having a tubular head 38 which tapers from one end to the other. A pair of annular openings 39 and 40 are formed transversely the shank 3 of the shifter. Engaged through one of the openings is a link 41 terminating in an eye 42 for engagement with an eye rod 43 loosely engaged through the extremity of the cam ring arm 35. A shoulder 44 is formed on the eye rod, between which and the under face of the arm 35 a coil spring 45 surrounding the rod, is held under tension. Through the other opening 39, one end for a connecting rod 46 is engaged, the other end of said rod being connected to a collar 47 loosely mounted upon the power driven shaft 3. The collar 47 is provided with an annular groove 48 to loosely receive the annular head ring 49 of a shifting lever 50.

It is evident that when the loose collar 47 is shifted along the shaft 3 by the shifting lever 50, away from the clutch members, the shifter 37 will be slid inward in the channel 25. The arm 35 will be rocked upward by this movement of the shifter through the medium of the rods 41 and 43, thereby disengaging the interfitted stop shoulders of the cam 27 and abutment ring 13, and permitting the oppositely inclined cam faces of the abutment ring 13 and cam ring 27 to coöperate and force the cam ring against the opposed face 34 of the bearing hub 11 and expand the driven member 2 carried thereby into positive frictional engagement with the driving or fast member 1.

In order to disengage the driven member from the driving member the operation above described is reverse.

Secured to the periphery of the cam ring 27 and intermediate the stop shoulders 31 and 32 thereof is a retracting member 51. The retracting member 51 is substantially a flat bar the terminals of which are bent approximately at right angles to the body portion of the bar to form arms 52 and 53 one of which engages the spiral groove 22 formed in the abutment ring 13, and the other of which engages an annular groove 54 formed in the periphery of the bearing hub 10. The object of the retracting member is to draw outward the bearing hub 10 of the driven member 2 when the arm 35 of the cam ring is rocked downward through the medium of the shifter 37 and shifting lever 50, so that the driven member will be positively disengaged from the driving member and held in this released position until the shifting lever is operated to expand the parts to operative position. The driven member is positively held against accidental engagement with the driving member, by the terminal of the retracting member loosely engaging the annular groove of the bearing hub of the driven member, which latter will remain stationary on the power driven shaft 3 when the clutching devices are not in engaged position.

In operation it is evident that the split ring 13 forms an abutment ring against which the cam ring 27 bears when expanding the loose pulley or driven member 2 into frictional engagement with the rim of the driving member. To adjust the abutment ring 13 to take up the wear upon the parts it is only necessary to loosen the clamping bolt 17 and advance the abutment ring to the desired position on the threaded extremity of the elongated hub 7, the cam ring being thereby advanced until its bearing face is again in engagement with the opposed bearing face of the loose hub 11. It is essential that the clutch devices be in released position during this operation so that the parts will be in the position shown in Fig. 1 when the abutment ring is clamped in position.

It will be noted that the channel 25 of the arm 23 by being sloped from the root to the free end of the arm will permit the shifter to be easily started from a position of rest at either extremity of the channel, the spring actuated connecting links 41 and 43 being adapted to yield sufficiently to prevent any jar or racking strain upon the parts during this shifting movement.

It will be further noted that the cam faces of the cam ring and abutment ring receive the strain of expanding the driven member into engagement with the driving member, and that when the said member is so expanded the clutch devices will be relieved of strain as no parts of the said clutch devices are interposed between the driven and driving members.

From the foregoing description taken in connection with the accompanying drawing it is thought that the construction and operation of our invention will be easily understood without a more extended explanation it being understood that various changes in the size, proportion and minor details of construction may be made without sacrificing any of the advantages or departing from the spirit of the invention.

What is claimed is;—

1. In a clutch pulley, driving and driven members, one member having a hub adapted to receive a shaft and upon which the other member is rotatably mounted, an abutment ring adjustably mounted upon said hub, a cam ring mounted for revoluble movement upon said hub, and having a cam face to engage said abutment ring, means for rocking said cam ring whereby to move said driven member into frictional engagement with the driving member, and means for retracting said members from engagement.

2. In a clutch pulley, driving and driven members one of which is provided with a shaft receiving hub upon which the other is mounted, an abutment ring adjustably mounted upon said hub and having a helical cam face, a cam ring carried by said hub and having a helical face adapted to bear against the cam face of said abutment ring, means for rotating said cam ring whereby to move said members into frictional engagement, and means for retracting said members from engagement.

3. In a clutch pulley, driving and driven members, one of said members having a hub adapted to be rigidly secured to a shaft, and the other of said members being mounted for independent rotation upon said hub, an abutment ring mounted upon said hub and having a spiral groove formed on its periphery, a cam ring mounted for revoluble movement upon said hub and adapted to coöperate with the abutment ring whereby to move the driving and driven members into frictional engagement, and a retracting member carried by said cam ring having one extremity engageable with said spiral groove and the other with said independently rotatable member whereby to release said members from engagement.

4. In a clutch pulley, driving and driven members, one of said members having a hub adapted to be rigidly secured to a shaft, and the other of said members having a bearing hub loosely mounted on said elongated hub, said bearing hub being provided with an annular recess adjacent one end, an abutment ring upon said elongated hub and having a spiral groove formed on its periphery, a cam ring mounted for rotation upon said elongated hub and adapted to coöperate with the abutment ring whereby to move the driving and driven members into frictional engagement, means for limiting the rotary movement of said cam ring, and a retracting member carried by said cam ring having terminal arms one of which is engageable with said spiral groove and the other with said annular recess whereby to retract the driving and driven members from frictional engagement.

5. In a clutch pulley, driving and driven members, one of the said members having a hub adapted to be rigidly secured to a shaft, the other of said members being mounted for independent rotation upon said hub, an abutment ring mounted upon said hub having a helical cam face provided with alternate elevations and depressions that form shoulders at their point of meeting, a cam ring mounted for rotation on said elongated hub and having a helical cam face provided with alternate elevations and depressions that form shoulders at their points of meeting to engage the shoulders of the abutment ring whereby to limit the rotary movement of the cam ring, means for rotating the cam ring whereby to move the driving and driven members into frictional engagement, and a retracting ring carried by the cam member and engageable with the abutment ring and the independently rotatable member whereby to release said members from frictional engagement.

6. In a clutch pulley, driving and driven members, one of said members having a hub adapted to be rigidly secured to a shaft, and the other of said members being loosely mounted upon said hub, an abutment ring mounted upon the extremity of said hub having a channeled arm projecting from its periphery, a cam ring mounted for limited rotation upon said elongated hub and having an arm projecting from its periphery so as to normally extend over said channeled arm, a shifter slidably mounted in said channeled arm, a link connecting said shifter with the arm carried by the cam ring, and means for sliding said shifter in said channeled arm whereby to rock the cam ring and move the driving and driven members into frictional engagement.

In testimony that we claim the foregoing as our own, we have hereto affixed our signatures in the presence of two witnesses.

JAMES McSTAY.
EDWARD F. STEVENS.

Witnesses:
C. L. MYERS,
R. F. BIGELOW.